April 1, 1941. J. R. AYOTTE 2,236,786
DISPENSING DEVICE
Filed Aug. 28, 1939
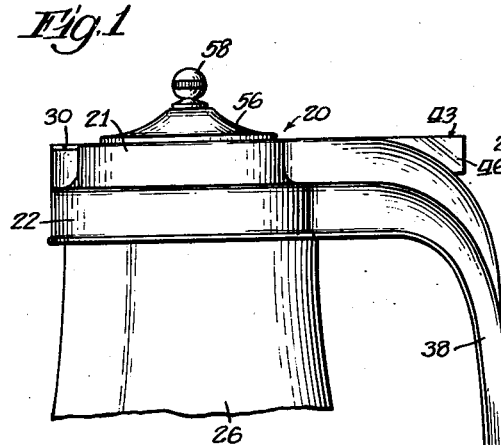
Inventor:
Joseph Rene Ayotte
By Max Richard Kraus Atty.

Patented Apr. 1, 1941

2,236,786

UNITED STATES PATENT OFFICE 2,236,786

DISPENSING DEVICE

Joseph Rene Ayotte, Chicago, Ill.

Application August 28, 1939, Serial No. 292,159

7 Claims. (Cl. 221—16)

This invention relates to improvements in dispensing devices and the like.

One of the objects of this invention is the provision of a dispensing device for viscous liquids, granules and other products which is operable to quickly and cleanly cut off the discharge flow so as to prevent dripping when the pouring operation is being completed.

Another object of this invention is the provision of a dispensing device which is actuated by a forward movement of the thumb in keeping with the natural tendency of the operator to exert a forward pressure with the thumb when lifting a container for a pouring operation.

A further object of this invention is the provision of a closure member on a dispensing device which effects a tight seal with a discharge opening so as to prevent accidental spilling of the contents and the entrance of foreign matter into the container.

A further object of this invention is the provision of a dispensing device which can be kept sanitary and easily cleaned.

A still further object of this invention is the provision of a dispensing device of the character described which is simple in construction, efficient in operation and economical to manufacture.

Other objects will become apparent as this description progresses.

In the drawing, wherein like reference characters denote corresponding parts through the several views:

Fig. 1 is a side elevational view of the dispensing device showing same applied to a container or bottle.

Fig. 2 is a plan view of the device shown in Fig. 1.

Fig. 3 is a plan view with the cap removed showing the operating mechanism in normal inoperative position and the discharge opening closed.

Fig. 4 is a similar view showing the operating mechanism in operative position and the discharge opening open.

Fig. 5 is a cross sectional view taken on line 5—5 of Fig. 2.

Fig. 6 is an enlarged fragmentary cross sectional view taken on line 6—6 of Fig. 2.

Fig. 7 is an enlarged fragmentary cross sectional view taken on line 7—7 of Fig. 5.

Fig. 8 is a cross sectional view taken on line 8—8 of Fig. 5.

Fig. 9 is an enlarged fragmentary cross sectional view taken on line 9—9 of Fig. 2.

Referring to the drawing, wherein is shown a preferred embodiment of my invention, the numeral 20 designates generally, a body portion having a cover surface 21 provided with an annular flange 22 having screw threads 24 which are adapted to engage complementary threads on the neck of a bottle or container 26 for detachably securing the device on a container. A discharge opening 27 is formed forwardly of the body portion, the pouring side thereof being inclined to provide a comparatively thin lip 28 to facilitate the pouring of the liquid from the container.

Extending diametrically across the cover surface 21 of the body portion is a channel or recess 29 alined with the discharge opening 27 and adapted to form a guideway for the closure member 30, presently to be described. A boss 31 formed on the under side of said cover surface 21 serves to provide anchorage for a pin 32 which extends upwardly and which serves to rotatably retain a pinion 33 in position. The pinion 33 is received in an annular recess 35 provided centrally of the cover surface 21 and is adapted to ride therein. A plurality of grooves 36 are formed in the base of the channel 29 and extend longitudinally thereof. Integrally formed with the body portion and flange is a handle 38 which is provided with a channel 40, the side walls of which are undercut, as at 41, to receive the actuating member 43, presently to be described. An aperture 44 adapted to serve as an air vent is additionally provided in the cover surface 21 of the body portion.

The actuating member 43 comprises a hollow body portion 46 substantially rectangular in cross section and adapted for sliding movement in cesess 40. The hollow body portion 46 is closed at the exposed end where it is engageable by the thumb. Extending sidewardly from opposite sides of the base of the body portion 46 are projections 47 which are adapted to be received in the undercut portions of the side walls of the channel 40. The actuating member 43 is thereby secured in the channel 40 against accidental removal therefrom, but is yet slidable therein. Integrally formed with the body portion 46 is an extension 48 which terminates in a rack 49, the latter being provided with gear teeth complementary to the pinion 33. An aperture 50 is provided in the extension 48 and is adapted to register with the air vent 44 when liquid is to be dispensed.

A closure or shearing member 30 provided with a rack 52, similar to the rack 49, is adapted to be received in the channel 29 and to slide therein. It is seen, by reference to Figures 3 and 4, that the racks 49 and 52 engage the pinion 33 on opposite sides thereof and are suitably cut away to accommodate the terminal portions of opposite racks to provide a more compact arrangement of parts. A coil spring 54 contained in the hollow body portion 46 abuts the flange 22 and serves to maintain the actuating member 43 in normal inoperative position, as shown in Fig. 3, with the closure member 30 in registration with the discharge opening 27. The movement of the actuating member 43, in a direction wherein the spring 54 is expanded, is limited by the end wall 53 of the channel 29 against which the portions 55 of the extension 48 normally abut.

A cap member 56 provided with a central aperture is adapted to be received on the pin 32 and to be secured in position by a threaded element 58. The said cap member serves to cover the operating mechanism and also to retain the parts in their respective positions.

In the operation of the device, the handle is grasped by the hand and forward pressure is applied, with the thumb, to the member 43 to compress the spring 54. It will be noted that it is the natural tendency for one to exert forward pressure with the thumb when lifting a device of this character and tilting same for pouring liquid from a container. As the member 43 moves forwardly or to the left, as viewed in the drawing, the rack 49 which is integral therewith rotates the pinion 33 in a counterclockwise direction. Simultaneously the pinion 33 actuates the rack 52 of the closure member 30 to retract same and to uncover the discharge opening 27 whereupon the contents of the container may be poured through the discharge opening. The retraction of the closure member 30 is limited by the engagement of the end portions of the racks with complementary shaped portions in the closure member 30 and extension 48 as shown at Fig. 4. When the thumb pressure is released the expanding spring 54 causes the member 43 to move rearwardly or to the right, as viewed in the drawing, and to rotate the pinion 33 in a clockwise direction whereby the closure member 30 is moved towards the left, as viewed in the drawing, to close the discharge opening. The return movement of the closure member 30 to normal position is very rapid so that a quick severance of the stream of liquid or other material is effected and the possibility of dripping is eliminated. Should any liquid adhere to the underside of the closure member, it will generally be wiped off at the edge of the discharge opening, however such liquid as is not wiped off will flow into the grooves 36 in the base of the channel and drain back into the channel. By providing draining means of this character, the closure member will at all times ride flatly in the channel and will not be raised due to an accumulation thereunder.

It is to be understood that the form of my invention, herewith shown and described, is to be taken as a preferred example of the same, and that various changes in the shape, size and arrangement of parts may be resorted to, without departing from the spirit of my invention or the scope of the appended claims.

I claim:

1. A dispensing device of the class described comprising a body portion having a cover surface and a discharge opening, a handle associated with said body portion, a pinion, an actuating member for operating said pinion, means for normally urging said actuating member rearwardly, a closure member operated by said pinion and adapted to normally close said discharge opening, said handle adapted to be grasped by the hand and the actuating member adapted to be pushed forwardly by the thumb to operate said pinion and simultaneously to retract said closure member to uncover said discharge opening.

2. A dispensing device of the class described comprising a body portion having a cover surface and a discharge opening, a handle associated with said body portion, said cover surface having a longitudinal guideway, a pinion, a closure member for said discharge opening slidable in said guideway and in engagement with said pinion, an actuating member slidable in said guideway and in engagement with said pinion to operate same, means for normally urging said actuating member rearwardly to cause said closure member to close said discharge opening, said handle adapted to be grasped by the hand and the actuating member adapted to be pushed forwardly by the thumb to operate said pinion and simultaneously to retract said closure member to uncover said discharge opening.

3. A dispensing device of the class described comprising a body portion having a cover surface and a discharge opening, a handle associated with said body portion and having a guideway therein, said cover surface having a longitudinal guideway, a pinion, an actuating member, a closure member for said discharge opening, said actuating member and said closure member slidable in the guideways of said handle and said cover surface and in engagement with said pinion, spring means for normally urging said actuating member rearwardly to cause said closure member to close said discharge opening, said handle adapted to be grasped by the hand and the actuating member adapted to be pushed forwardly by the thumb to operate said pinion and simultaneously to retract said closure member to uncover said discharge opening.

4. A dispensing device of the character described comprising a body portion having a cover surface and a discharge opening, a closure member normally closing said discharge opening and having a toothed rack portion, a pinion engaging said rack portion, an actuating member having a toothed rack portion engaging said pinion, said pinion adapted to be rotated by a forward movement of said actuating member to cause a rearward movement of said closure member whereby said discharge opening is uncovered.

5. A dispensing device of the character described comprising a body portion having a cover surface and a discharge opening, a closure member normally closing said discharge opening, a rotatable pinion, a thumb engaging actuating member, said closure member and said actuating member each having a toothed rack portion oppositely disposed and in engagement with said pinion, said pinion adapted to be rotated by a forward movement of said actuating member to cause a rearward movement of said closure member whereby said discharge opening is uncovered.

6. A dispensing device of the character described comprising a body portion having a cover surface and a discharge opening, a closure member normally closing said discharge opening and slidable on said cover surface, a pinion rotatably mounted on said cover surface, a thumb engaging actuating member arranged for sliding movement, said closure member and said actuating member each having a toothed rack portion integral therewith, the said rack portions engaging said pinion in opposed relation, said pinion adapted to be rotated by a forward movement of said actuating member to cause a rearward movement of said closure member whereby said discharge opening is uncovered.

7. A dispensing device of the character described comprising a body portion having a cover surface and a discharge opening, a closure member normally closing said discharge opening and having a toothed rack portion integral therewith, a rotatable pinion mounted on said cover surface, an actuating member having a toothed rack portion, said rack portions being in operative engagement with said pinion whereby the rotation of said pinion by a forward movement of said actuating member will cause a retraction of said closure member to uncover said opening.

JOSEPH RENE AYOTTE.